Sept. 2, 1952      W. A. KURING ET AL      2,609,172

COMBINATION WEIGHING AND MIXING MACHINE

Filed Dec. 1, 1950      3 Sheets-Sheet 1

Inventors:
William A. Kuring &
Bernard A. Erickson,
By [signature]
Atty.

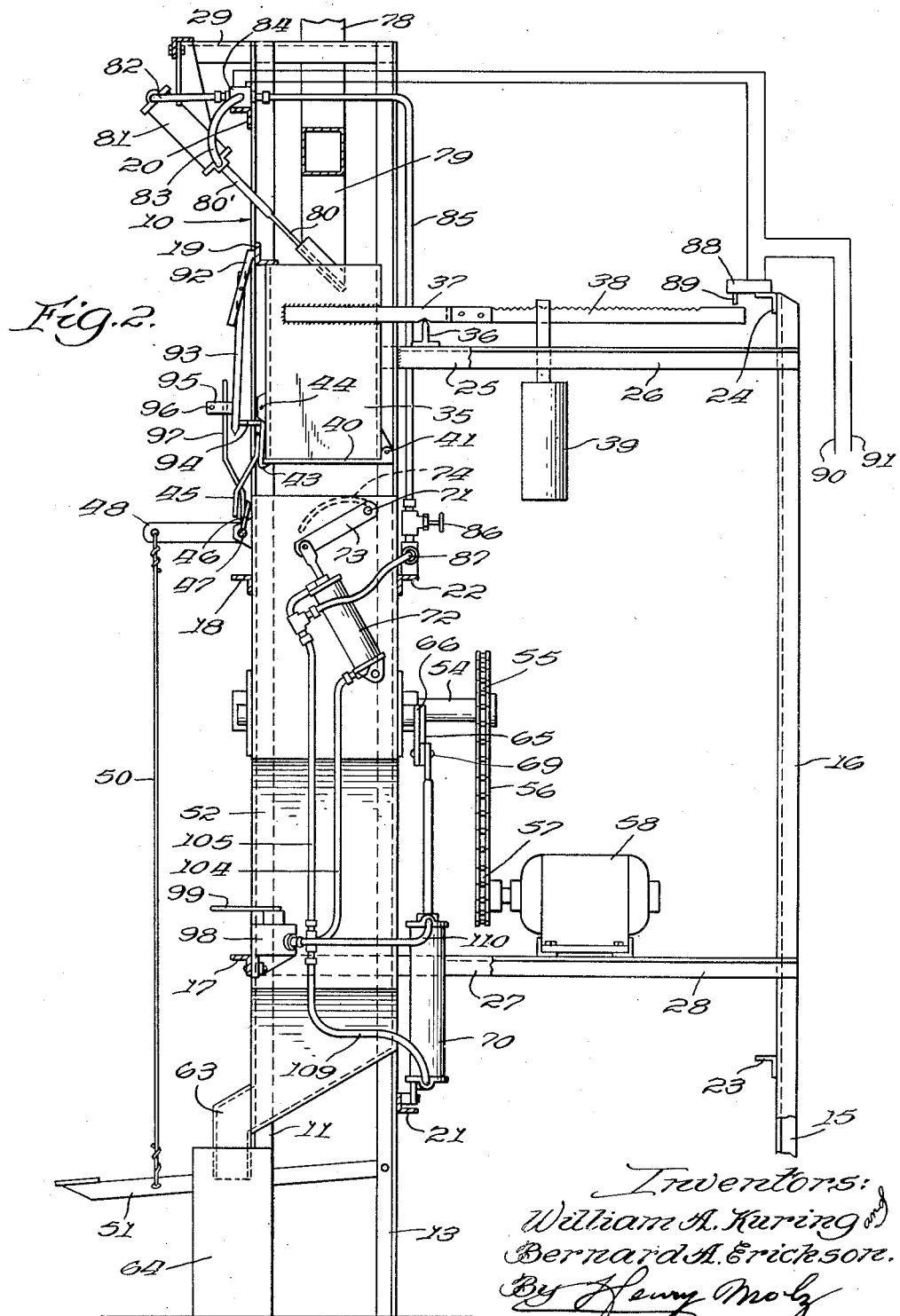

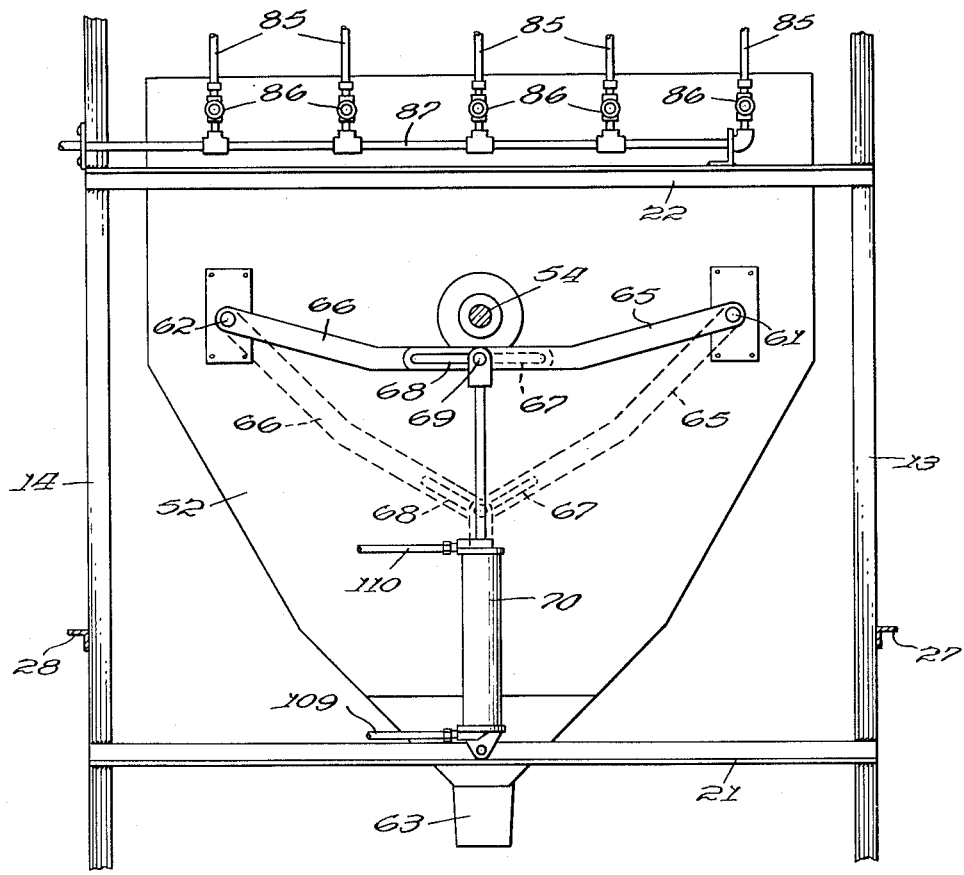
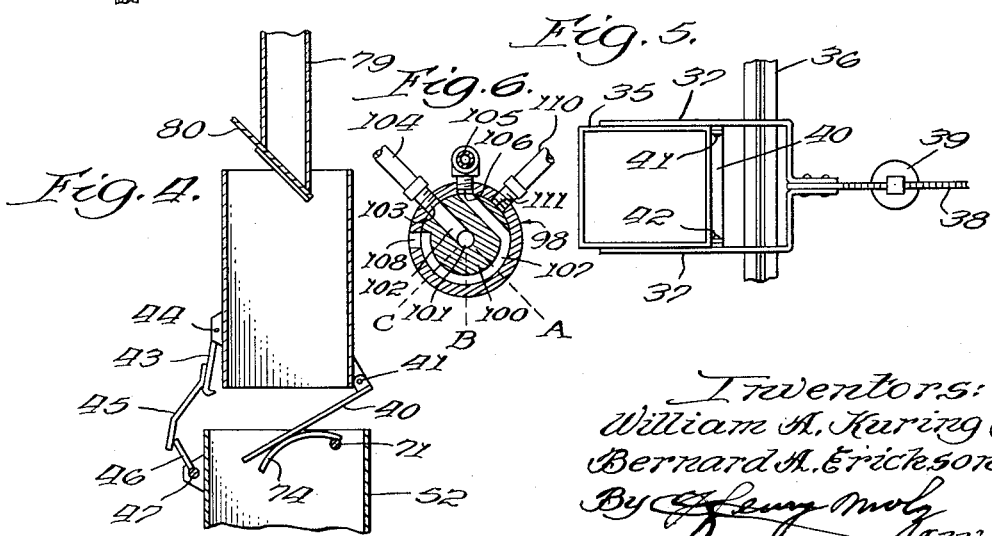

Patented Sept. 2, 1952

2,609,172

UNITED STATES PATENT OFFICE 2,609,172

COMBINATION WEIGHING AND MIXING MACHINE

William A. Kuring, La Crescenta, and Bernard A. Erickson, Glendale, Calif.

Application December 1, 1950, Serial No. 198,555

5 Claims. (Cl. 249—22)

The primary purpose of our invention is to provide a machine adaptable for weighing materials of varying kind in either a liquid or dry state, and substantially simultaneously therewith, mixing the same into a thoroughly commingled state;

A further and important object of our invention is the provision of a machine wherein products regardless of consistency from the lighter such as food or other products in either a dry or liquid state, to the more heavier such as, concrete mix ingredients, for example, may readily be weighed and mixed, ready for immediate use;

A further object of our invention is the provision of a machine whereby the several products entering into the combined mix are simultaneously but separately fed into the machine, simultaneously weighed and released in desired proportion to the mixing chamber, and therein thoroughly commingled into a uniform mass;

A still further object of our invention is the provision of a machine whereby the products fed and commingled therein into a uniform mass, may be released therefrom at will into appropriate container means for stocking, sale and use.

And a still further object of the invention is the provision of a machine wherein the several independent weighing units not necessary for certain formulae are adapted to remain inoperative during operation of the machine, and to automatically stop the flow of material into any or all of said weighing units when the correct weight or proportion of ingredients entering into the mixture has been reached.

Other objects and specific advantages of the invention will the more fully appear from the following description and accompanying drawings, in which:

Figure 2 is a side elevation of the invention as shown in Fig. 1, but partly in section;

Figure 3 is a fragmentary rear elevation of a portion of the mixing chamber and shows the method of opening and closing the gates which form the bottom of the mixing chamber;

Figure 4 is a sectional view taken on line 4—4 in Fig. 1, as viewed in the direction of the arrows;

Figure 5 is a fragmentary plan view of one of the weighing units, and

Figure 6 is a horizontal sectional view of the air control valve.

Figure 1:
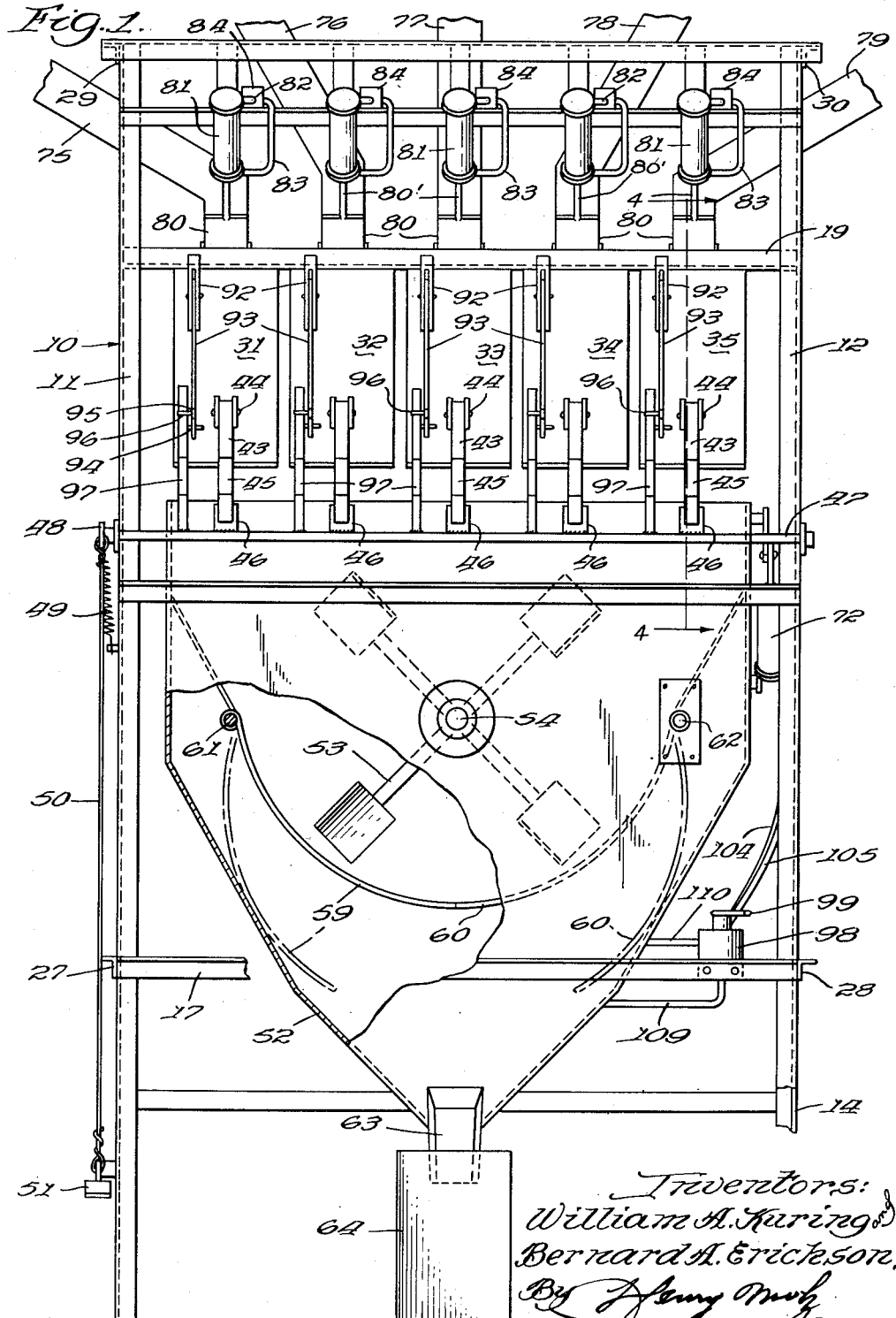
Figure 1 is a front elevation of the invention.

Similar numerals of reference indicate like parts throughout the several views, the machine including in its structure a frame 10 for supporting the various units of the invention. The frame comprises front vertical members 11 and 12, intermediate vertical members 13 and 14, and rear vertical members 15 and 16 which are tied together by cross members. The front vertical members 11 and 12 are thus joined by cross members 17, 18, 19 and 20. The intermediate vertical members are joined by cross members 21 and 22, and the rear vertical members are joined by cross members 23 and 24. The pairs of vertical members are joined by transverse frame members 25 and 26 above, and 27 and 28 below. The front and intermediate pairs of vertical members are further joined at their upper ends by members 29 and 30. All of said frame members are firmly secured by welding or other suitable means.

Located near the upper end of the frame structure, is a series of weighing units in the form of bucket-like containers designated generally by the reference numerals 31, 32, 33, 34 and 35. Said weighing containers are pivoted on a fulcrum 36, in the form of a T member supported on the frame members 25 and 26. Members 37 are secured to the side of the weighing containers to form a bale which has a two point support on the fulcrum 36 for stability, as shown in Fig. 5. Beams 38 are secured between the free ends of the members 37, and are notched for adjustably mounting weights 39. The latter hold the weighing containers against the cross frame member 19, which acts as a stop. Moving the weight to the left or right as viewed in Fig. 2 determines the amount of material which is to run or be fed into the weighing containers. Moving the weight to the right would allow more material to be fed in the weighing container, and conversely, moving same to the left, less material. When the quantity of material in the weighing containers is sufficient to lift the weight, the flow of material therein is automatically stopped as will hereinafter be described.

The weighing containers are in the form of a rectangular box, open at the top and equipped with closure means in the formed hinged bottoms 40 adapted to be opened for emptying the container. As the latter are identical in structure, a description of the one disclosed in Fig. 2 will suffice for all.

As shown in Figures 2, 4 and 5, the bottoms 40 of the containers are hinged at 41 and 42, and are held in closed position by latch members 43. The latter are pivoted at 44 and hang by gravity in a position to hold in closed positions the bottoms of said weighing containers. Each of the latch members has a depending leg 45 welded thereto and held in a position to be engaged by lugs 46 secured to a cross shaft 47. Said shaft is connected to an arm 48 which is pivoted near its center on the vertical frame member 11. A spring 49 is connected to the rear end of the arm 48 to exert a downward pull and cause the lugs 46 in their normal position to lay back against the front of the weighing container. The front end of the arm 48 is connected by a cable 50 to a foot pedal 51 pivoted on the vertical frame member 13. Pressure on the foot pedal causes rotation of the shaft 47 so as to cause the latch members 43 to disengage the bottoms of the weighing containers and permit the contents thereof to be gravitationally discharged.

When the amount of material in the weighing container required for a particular mix reaches the weight determined by the position of the weights 39 on the beams 38, and the container bottoms have been tripped, the material moves down into a mixing bin or hopper, as is shown in Figure 4. The bin is equipped with a rotating agitator 53 for mixing and otherwise transforming said materials into a uniform mass. The agitator is mounted on a shaft 54 journalled in the front and rear walls of the mixing bin. The rear end of the shaft 54 is equipped with a sprocket gear 55, which engages a sprocket chain 56. The latter is in engagement with a sprocket 57 carried on the shaft of a motor 58 to cause rotation of the agitator 53.

The mixing bin 52 is also provided with a pair of gates 59 and 60. These gates together form an arcuate bottom to the mixing zone of the bin 52. They further serve to hold the material being mixed in definite contact with the agitator. The gates 59 and 60 are carried on shafts 61 and 62 respectively and are adapted to swing down to permit the mixed material to pass into the lower end of the mixing bin where it can pass out of the spout 63 and into suitable containers such as the bag 64, shown.

As shown in Figure 3, the gate shafts protrude out through the rear of the mixing bin and have secured to their ends, arms 65 and 66. These arms are provided in their inner ends with slots 67 and 68 respectively which are engaged by a pin 69 carried on the upper end of a connecting rod of a piston operating in a cylinder 70. When the latter is actuated to lower said connecting rod, the pin 69 rides in the slots 67 and 68, causing the arms 65 and 66 to be lowered as shown in the dotted position in Fig. 3, thus opening the gates 59 and 60 to discharge the material. In Fig. 1, the gates are shown by dash-dot lines in open position. This completes the sequence of operation. The machine is then ready for a new circle of operation. The weighing container bottoms are closed. To expeditely accomplish this, we have provided a shaft 71 actuated by a cylinder 72 through the medium of an arm 73. The shaft has secured thereto a series of curved lugs 74, one for each weighing container. They are positioned as shown in Fig. 4, to hold the bottoms of the weighing container. When the shaft 71 is rotated by the cylinder 72 the curved lugs lift said bottoms to their closed positions where they are engaged and held by means of the latches 43. The containers are then ready for refilling.

Positioned directly above the weighing containers 31, 32, 33, 34 and 35, is a series of feed chutes 75, 76, 77, 78 and 79 which, for example, carry crushed rock, sifted sand, cement, lime and concrete sand respectively. These chutes are equipped at their bottom ends with valve means in the form of sliding knife-gates 80 to control the flow of materials into the weighing containers. Said gates are secured to the free ends of piston rods 80' carried by pistons (not shown) operating in cylinders 81. Each cylinder 81 is operated positively in both directions, air being introduced through hoses 82 and 83 to opposite ends of the cylinders respectively. Said pairs of air lines are connected to solenoid operated valves 84 which receive air through lines 85 connected through valves 86 to a header line 87, as shown in Figure 3. Air travels both to and from the cylinders 81 through the same lines, the exhaust being through the bottoms of the solenoid valves. It will be understood that any of the valves 86 may be closed to cause certain of the cylinders 81 to remain inactive and their gates closed to the passage of materials. Thus any combination of materials may be selected as desired for a certain mix.

Secured to the top of the frame member 24 and in positions directly over the free ends of the beams 38, is a series of switches 88, one for each solenoid valve 84. Said switches are in circuit with said solenoid valves 84 and make or break the current flow through the lines 90 and 91. When the free ends of the beams are in their down positions and out of engagement with the plungers 89 of the switches 88, the latter are open. When air flows through the line 87 and the switches 88 are open the air flows to the bottoms of the cylinders 81 and out at the top thereof, thus opening the knife-gates 80 for the passage of material into the weighing containers. As the latter fill the free ends of the beams rise and contact the plungers 89, and the switches close to cause actuation of the solenoid valves to reverse the flow of air to the cylinders 81, thus closing the knife-gates 80.

Means have been provided to prevent chattering of the weighing containers when the amount of material therein has caused the latter to drop. Secured to the front of the frame member 19 is a series of depending members 92 which have pivoted thereon pointed holding members 93 which normally rest against lugs 94 welded to the fronts of the weighing containers. When the weight of the material in the weighing containers has caused them to drop, the holding members fall by gravity to a position where they are resting on the tops of the lugs 94, thus preventing chattering. In order to release the holding members, ears 95 secured to the fronts of the members carry pins 96 which are engaged by lugs 97 secured to the rotatable shaft 47. Thus when the shaft 47 is rotated to trip the bottoms of the weighing containers, the holding means is also tripped to allow the weighing containers to rise and rest against the stop 19.

In the operation of the machine a three position valve 98 is provided to direct compressed air from a source of supply (not shown) to the various cylinders to cause the several operations to be performed in proper sequence. A handle 99 on the valve allows for proper setting of the valve. In Fig. 6 the three positions of the valve are shown by dotted lines A, B, and C.

In position A, air is introduced from the source of supply (not shown) into the rotor 100 of the valve as at 101 and flows out through the channel 102, through the port 103 and into the line 104. Said line 104 leads to the bottom of the cylinder 72 which rotates the shaft 71 to cause the lugs 74 thereon to close the bottoms of the weighing containers. The line 105 which is connected to the port 106 of the valve 98 serves to exhaust the top of the cylinder 72 in position A. An exhaust channel 107 in the rotor 100 connects with an exhaust port 108 in the body of the valve 98. This places the weighing containers in condition to receive material from the feed chutes.

In position B of the valve 98, air passes out through the port 106 and into the line 105. The latter is provided with a T to cause air to flow through line 109 to the lower end of the cylinder 70 to the upper end of the cylinder 72 and through another T to the line 87. Air from the top of cylinder 70 exhausts through line 110 through port 111 in the valve 98 and thence through channel 107 and port 108. Air in the lower end of cylinder 72 exhausts through line 104, port 103, channel 107 and port 108. Air thus supplied to the cylinder 81 causes the knife-gates to open and material begins to flow into the weighing containers, at the same time air supplied to the lower end of said cylinder 70, closes the gates in the mixing units, ready to receive the contents of the weighing containers.

Position C of the valve 98 allows air to flow through port 111, then through line 110 to cylinder 70, and shuts off air to line 87. Air from the bottom of cylinder 70 exhausts through line 109, port 106, channel 107 and exhaust port 108. Air entering the top of cylinder 70 causes the mixing unit gates to open and the material therein to be discharged. The air supply to the line 87 is shut off even though the chutes have already been closed by the action of the switches 88.

Our invention may readily be produced from materials the open market affords and in varying sizes to best meet the requirements of the respective materials intended to be handled therein.

We are aware that the numerous details of construction may be varied throughout a wide range of mechanical expediency without departing from the scope herein disclosed. Hence, we do not limit our invention to the precise structure herein shown and described other than is necessary by the appended claims. We do claim, however:

1. In a material weighing and mixing machine, a plurality of movable weighing containers, separate means for feeding material into each of said containers, closure means for each container operable for releasing the material therefrom, means associated with each container for automatically shutting off the feed thereto responsive to the presence therein of a predetermined weight of material, means for opening said closure means to release the contents of said containers, and means for each feeding means optionably movable between positions for rendering the associated feeding means operative and inoperative independent of movement of said weighing containers.

2. In a material weighing and mixing machine, a plurality of movable weighing containers, separate means for feeding material into each of said containers, closure means for each container operable for releasing the material therefrom, means associated with each container for automatically shutting off the feed thereto responsive to the presence therein of a predetermined weight of said material, means for opening said closure means to release the contents of said containers, and means associated with each container optionably operable independent of movement of said containers for simultaneously rendering inoperative the feed means and the shut off means for the associated containers.

3. In a material weighing and mixing machine, a frame, a plurality of upright containers movable on said frame and open at their upper and lower ends, closure means for the lower ends of said containers, individual feed chutes to said containers and arranged to discharge material into each of said containers, closure means for said chutes, means for closing the closure means for said chutes for shutting off the feed from said chutes to each individual container when a predetermined weight of material is deposited in the container, means for simultaneously opening the closure means for said containers, means for selectively rendering any one of said feed chutes inoperative, lugs fixed to said containers, members pivoted on said frame and depending therefrom for contacting the tops of said lugs upon predetermined movement of said containers, and means for moving said depending members out of said contact with said lugs responsive to the opening of said closure means.

4. In a material weighing and mixing machine, a frame, a plurality of upright containers movable on said frame and open at their upper and lower ends, closure means for the lower ends of said containers, individual feed chutes to said containers and arranged to discharge material into each of said containers, closure means for said chutes, means for closing the closure means of said chutes for shutting off the feed from said chutes to said separate containers when predetermined weights of material are deposited into the containers, means for simultaneously opening the closure means for each of said containers, means for selectively rendering any one of said feed chutes inoperative independent of movement of said containers, said closure means for said containers being arranged with latch means for holding the same in closed position and for releasing same to open position to effect the discharge of the material deposited in the containers into the mixing bin, holding members pivoted on said frame for movement into position to restrain movement of said containers preliminary to opening of the closure means for said containers, means for moving said holding members out of said position when said closure for said containers are opened, and optionally operable means for returning said closure means to position in which said closure means are latched in closed position.

5. In a material weighing and mixing machine, a frame, a plurality of weighing containers mounted for movement relative to said frame, separate means for feeding material into each of said containers, closure means for each container operable for releasing material therefrom, means associated with each container for automatically shutting off the feed thereto responsive to the presence therein of a predetermined weight of the material, means for opening the closure means to release the contents of the containers, means for operating said closure means to close said containers, lugs on said containers, holding members pivoted on the frame for gravitational movement into contact with said lugs for restraining movement of said containers when said containers move into a predetermined position responsive to weight of material therein, and means moving said holding members out of said contact with said lugs responsive to the opening of said closure means.

WILLIAM A. KURING.
BERNARD A. ERICKSON.

REFERENCES CITED

The following references are of record in the file of this patent:

UNITED STATES PATENTS

| Number | Name | Date |
|---|---|---|
| 845,990 | Wilcox | Mar. 5, 1907 |
| 888,572 | Avram | May 26, 1908 |
| 1,750,244 | Robb | Mar. 11, 1930 |
| 2,073,652 | Robb | Mar. 16, 1937 |
| 2,127,120 | Johnson et al. | Aug. 16, 1938 |
| 2,285,765 | Carswell | June 9, 1942 |